Dec. 15, 1942.  J. SINKOVITZ  2,304,855
MATERIAL HANDLING APPARATUS
Filed June 30, 1941   3 Sheets-Sheet 1
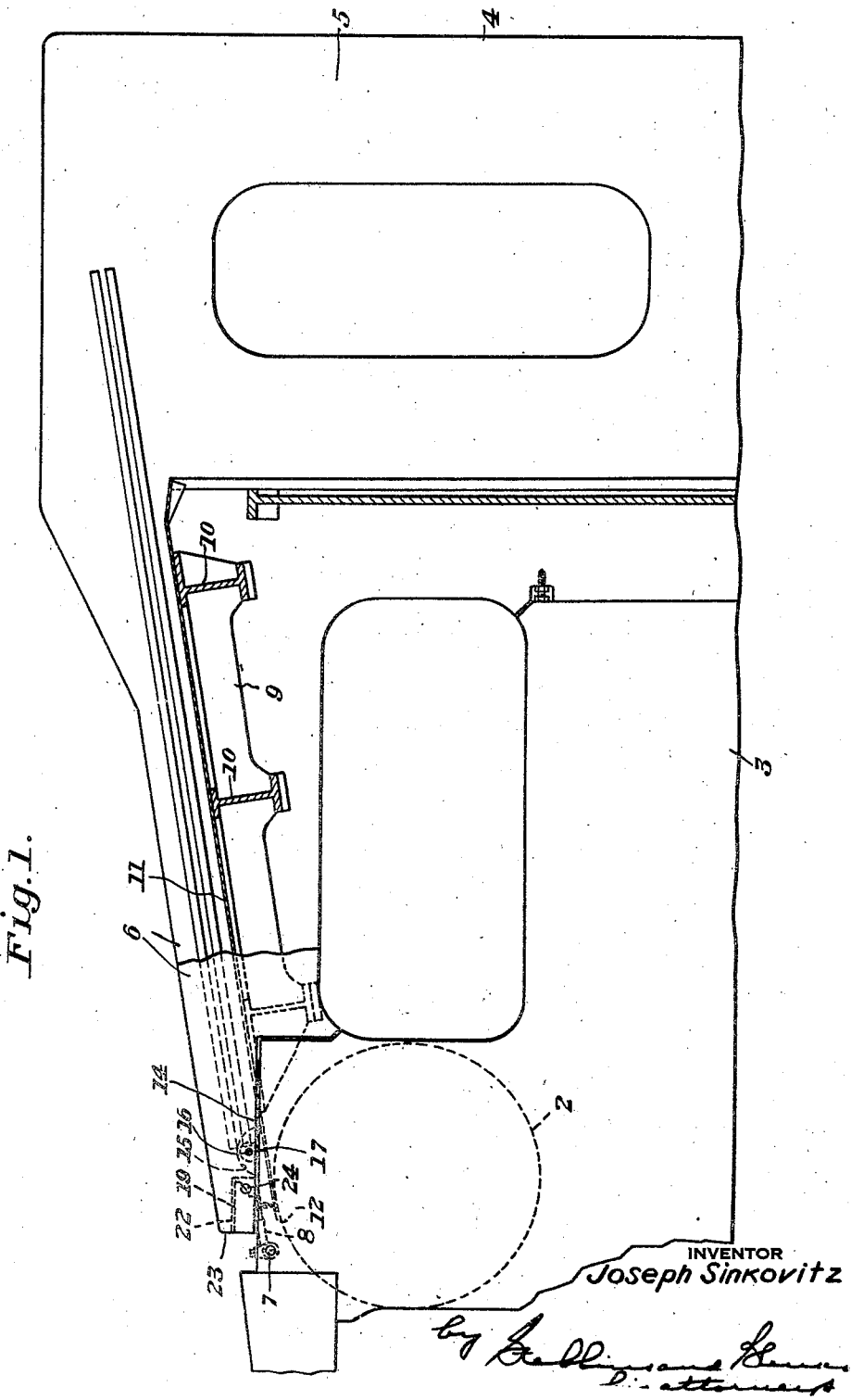
INVENTOR
Joseph Sinkovitz

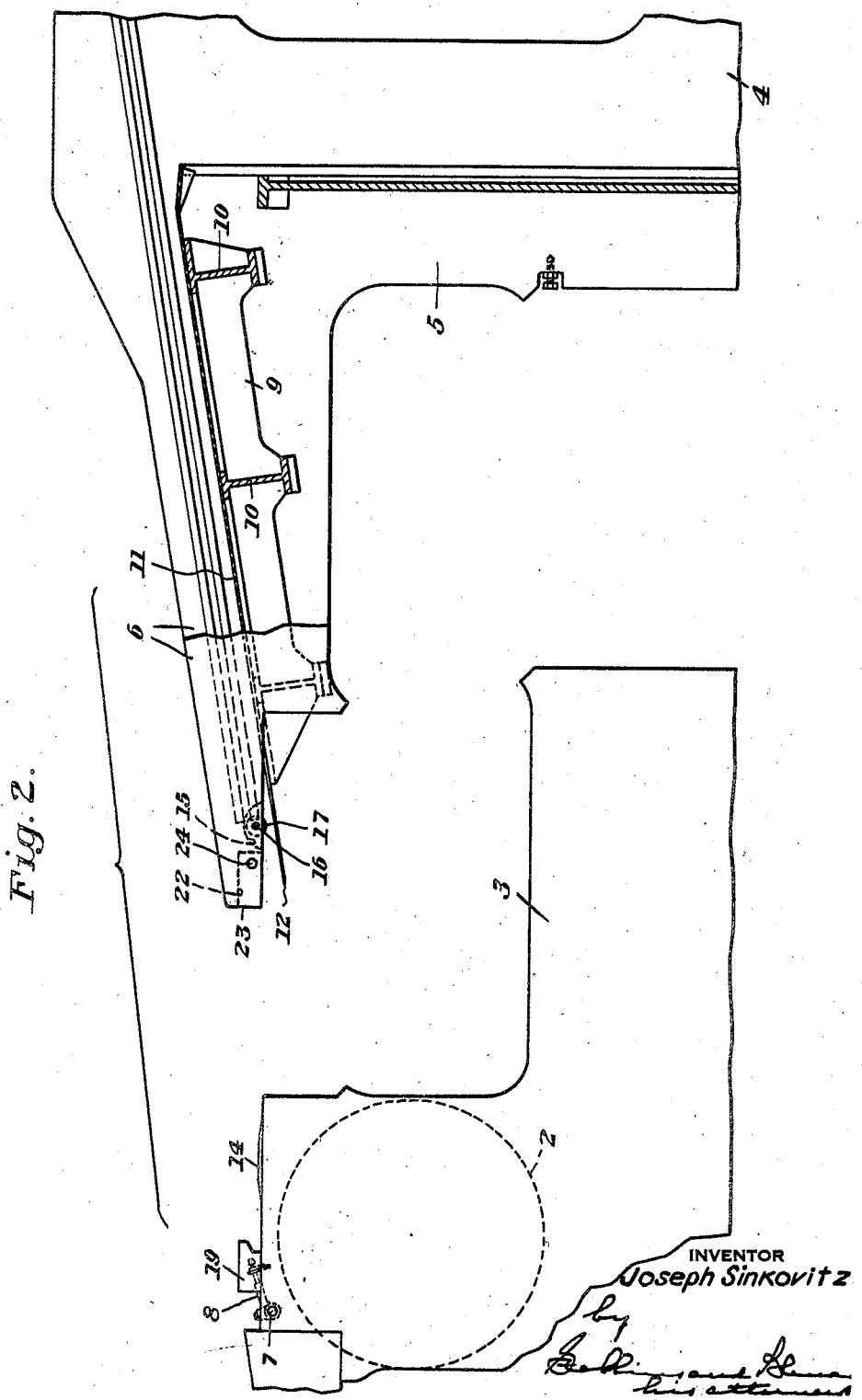

Dec. 15, 1942.                J. SINKOVITZ                2,304,855
                      MATERIAL HANDLING APPARATUS
                        Filed June 30, 1941            3 Sheets-Sheet 3
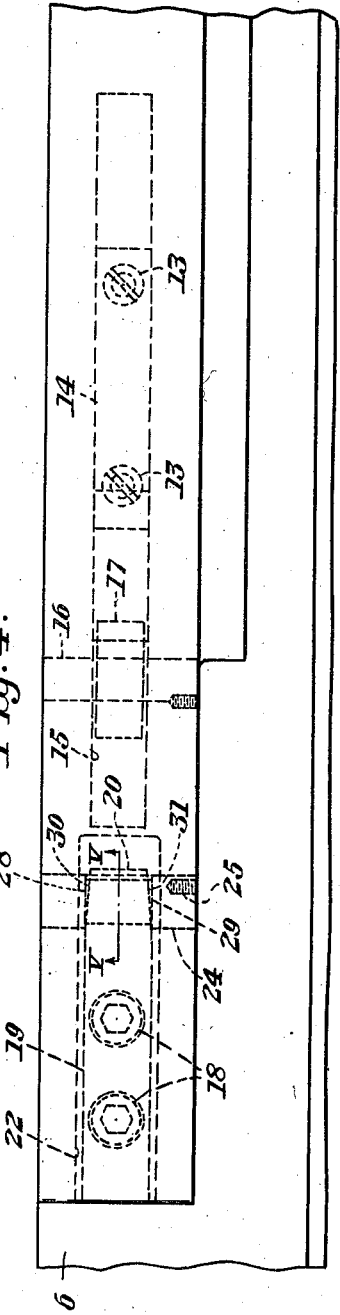
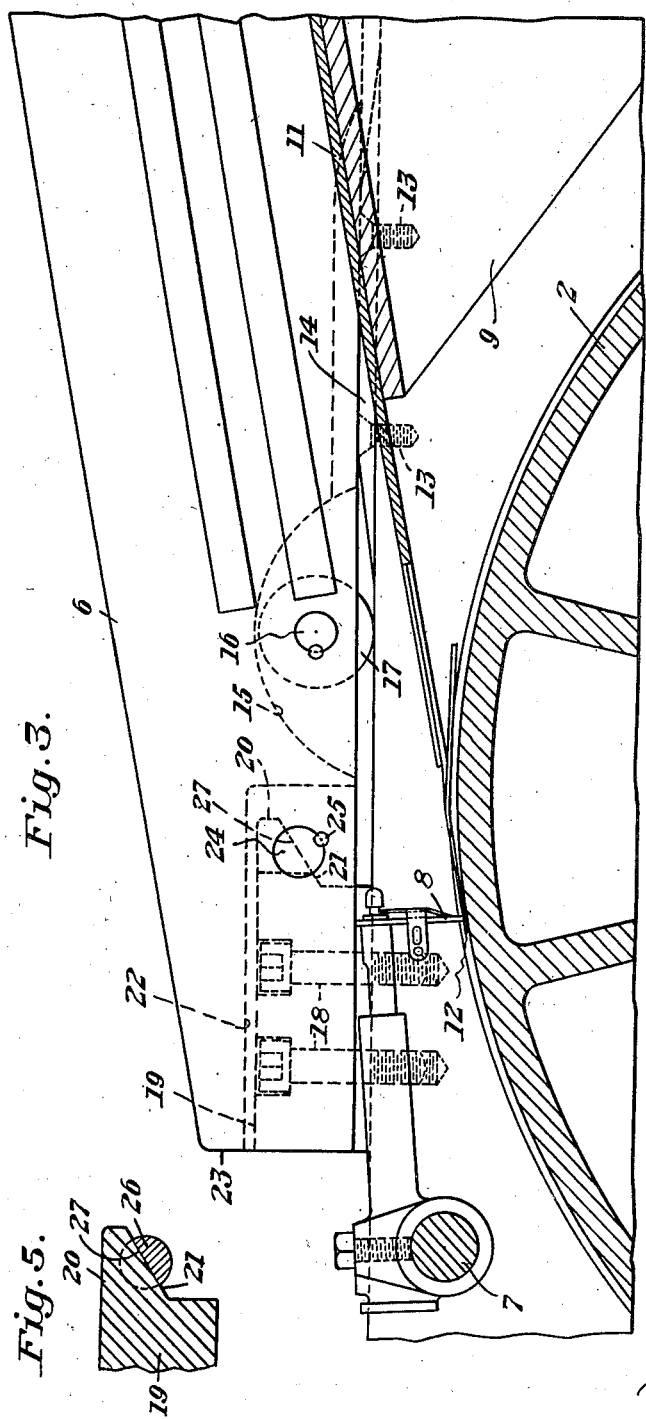
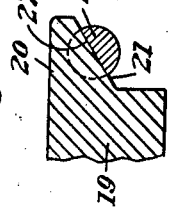
INVENTOR
Joseph Sinkovitz Patented Dec. 15, 1942

2,304,855

UNITED STATES PATENT OFFICE 2,304,855

MATERIAL HANDLING APPARATUS

Joseph Sinkovitz, Pittsburgh, Pa., assignor to Miller Printing Machinery Co., Pittsburgh, Pa., a corporation of Pennsylvania Application June 30, 1941, Serial No. 400,380

40 Claims. (Cl. 271—8)

This invention relates to material handling apparatus. It has to do primarily with material handling mechanism adapted to cooperate with means for operating on material and to improvements in the material handling mechanism and its connections with the operating means. The invention further relates to means for guiding material handling mechanism relatively to operating means in assembly and disassembly thereof.

While the invention is by no means so limited it is especially applicable to printing or like apparatus and particularly to sheet feeders. Purely for purposes of explanation and illustration the invention will be described as embodied in a sheet feeder used for feeding sheets to a flat bed and cylinder printing press.

A flat bed and cylinder printing press comprises a cylinder to which sheets are successively registered, the cylinder taking the sheets one at a time and carrying them into contact with the type form where they are printed. So-called drop guides or front guides are provided adjacent the cylinder for engaging the forward edges of sheets as they are successively advanced to the cylinder to properly position the sheets to be taken by the cylinder grippers. The sheets are forwarded to the cylinder by a feeder which comprises a feed board upon which the sheets move and positioned so that each sheet is properly presented to the drop guides.

The drop guides are positioned at the opposite side of a vertical plane passing through the cylinder axis from the body of the feeder. The feed board ordinarily extends downwardly at a small angle to the horizontal from the feeder to the cylinder. It passes over top the center of the cylinder and down close to the drop guides so that the top of the cylinder is horizontally interposed between the extremity of the feed board and the body of the feeder. Due to this arrangement it has been customary to hinge the feed board to the body of the feeder and it has been necessary to swing up the feed board whenever the feeder is to be moved to inoperative position. This has been undesirable because of the added expense of hingedly mounting the feed board, the fact that a separate manual operation—swinging the feed board up or down—has been required each time the feeder is moved toward or from operative position and because of the inevitable looseness at the joint between the feed board and the body of the feeder which results in some motion therebetween and which may cause faulty registry of sheets to the drop guides.

Moreover, there has always been danger that if the operator should forget to swing up the feed board upon moving the feeder relatively to the press this might result in damage to parts of the apparatus. Still further, means are provided above the feed board for forwarding the sheets thereon and the hinging of the feed board to the body of the feeder has materially complicated the drive for the forwarding means because it has been necessary to raise such means along with the feed board.

Also in feeders of the so-called "rollaway" type in which the feeder is mounted separately from the press and moves substantially in a straight line toward and away from the press difficulty has been experienced due to relative movement between the press and feeder during operation of the press. Means have been provided for preventing the feeder from backing off from the press during operation, but there is a tendency due to cyclic operation of both the press and feeder and due to the fact that the load on the feeder varies widely during operation for the parts to relatively deflect to some extent which in some cases interferes with proper feeding and registry of the sheets.

I have devised apparatus obviating all of the disadvantages above pointed out. I provide a feeder of the "rollaway" type which is mounted separately from the press and moves toward and away from the press substantially in a straight line and I fix the feed board rigidly to the body of the feeder, thereby reducing the cost of the structure, obviating any looseness or lost motion between the feed board and the feeder body and obviating the necessity of swinging the feed board up away from the press whenever the feeder is to be moved out to inoperative position. Whenever the feeder moves the feed board maintains its fixed rigid position with respect to the feeder body. In order to enable the extremity of the feed board to pass the top of the cylinder I provide for moving the feeder transversely during its movement toward and away from the press. I preferably provide cam and follower means on the feeder and press which tilt the feeder during its in and out movement to allow the extremity of the feed board to clear the top of the cylinder. Otherwise with the feed board fastened rigidly to the feeder it would strike the top of the cylinder upon relative movement between the feeder and press.

I also provide means for positively maintaining the press and feeder in fixed relative position when the feeder is moved in so that the feeder is held against movement relatively to the press in any direction transversely of the direction of movement of the feeder toward and from the press. I preferably form portions of the feeder and press so that they automatically move into cooperative position to accomplish this result. This obviates any transverse looseness or lost motion between the feeder and press which may result in improper feeding or registry of sheets.

Other details, objects and advantages of the invention will become apparent as the following description of a present preferred embodiment thereof proceeds.

In the accompanying drawings I have shown a present preferred embodiment of the invention, in which Figure 1 is a fragmentary elevational view of printing apparatus showing a portion of a flat bed and cylinder type printing press with a feeder in cooperative position relatively thereto;

Figure 2 is a view similar to Figure 1 showing the feeder moved out to inoperative position;

Figure 3 is a fragmentary elevational view to greatly enlarged scale and partly in vertical longitudinal cross section of a portion of the structure shown in Figure 1;

Figure 4 is a fragmentary plan view of a portion of the structure shown in Figure 3; and Figure 5 is a fragmentary vertical longitudinal cross-sectional view taken on the line V—V of Figure 4.

Referring now more particularly to the drawings, there is shown at 2 the cylinder of a flat bed and cylinder type printing press. The cylinder rotates in the counter-clockwise direction viewing Figures 1, 2 and 3 and makes two revolutions for each cycle of the bed. The bed forms no part of the present invention and is not shown but preferably underlies the cylinder and moves back and forth from right to left viewing Figure 1. The press has opposed side frames only one of which is shown and is designated by reference numeral 3. The side frames are cross-connected in the usual way to form the frame of the press in which the cylinder 2 is rotatably mounted. The press is mounted stationarily upon the press room floor. The feeder is designated generally by reference numeral 4 and comprises a body 5 and an extension 6. The feeder like the press has opposed side frames which are cross-connected to carry the pile support and the mechanism for feeding sheets therefrom to the press, the feeder being mounted for straight line movement toward and away from the press generally parallel to the extension 6. The feeder may be guided for such movement by tracks or any other suitable guide means (not shown).

Mounted in the press is a cross shaft 7 carrying drop guides 8 which may be of usual construction. The drop guides serve to engage the forward edges of sheets delivered from right to left viewing Figures 1, 2 and 3 along the feeder extension 6. The feeder extension 6 carries a casting 9 comprising struts 10 upon which is rigidly mounted a feed board 11. The feed board is preferably permanently rigidly and immovably fixed to the feeder. The left-hand extremity 12 of the feed board extends past a vertical plane containing the axis of the cylinder 2 from the body of the feeder and lies close to the upper surface of the cylinder so that the top of the cylinder is horizontally interposed between the extremity of the feed board and the body of the feeder. Thus if the feeder were moved rectilinearly toward and from the press the extremity of the feed board would strike the top of the cylinder.

Each of the press side frames 3 has secured to its upper surface by screws 13 a cam 14 as shown most clearly in Figure 3. Each of the feeder frame portions 9 has a recess 15 formed therein from its bottom surface upwardly and has a shaft 16 intersecting such recess rotatably carrying within the recess a cam following roller 17 adapted when the feeder is moved toward and from the press to ride upon one of the cams 14. Since the extension 6 is integral with the feeder engagement of the rollers 17 with the cams 14 upon movement of the feeder toward and from the press results in a slight tilting of the feeder during the time the rollers are in contact with the cams, such tilting occurring at such a time as to cause the extremity 12 of the feed board 11 to rise up sufficiently to pass the top of the cylinder, after which it is lowered to its normal level. Thus the movement of the feeder toward and from the press is rectilinear except that for a short distance the feeder during its rectilinear movement is tilted to allow the extremity of the feed board to clear the top of the cylinder.

Secured to the top of each of the press side frames 3 by screws 18 is an upward extension 19 having a tapered nose 20 whose under surface 21 is inclined upwardly and toward the feeder as most clearly shown in Figures 3 and 5. Each of the feeder frame portions 9 has a recess 22 extending upwardly from its under surface and also intersecting its end surface 23 and of a width somewhat greater than the width of the extension 19 so that when the feeder is moved toward the press the extension 19 will be received within the recess 22. Spanning the recess 22 in each of the feeder frame portions 9 is a shaft 24 which is held against rotation by a set screw 25. At its central portion each shaft 24 has one half cut away so that it appears in cross section as shown at 26 in Figure 5. Such portion of the shaft has an inclined generally upwardly facing surface 27. Intersecting the surface 27 are generally vertical surfaces 28 and 29. The surfaces 28 and 29 are shown as intersecting the surface 27 at right angles.

The nose 20 of each of the extensions 19 carried by the press frame is tapered not only horizontally but also vertically. Each such nose is bounded by generally vertical faces 30 and 31 as shown in Figure 4, which faces are slightly inclined toward each other. When the feeder is moved into cooperative relationship with respect to the press each of the extensions 19 with its nose 20 enters the corresponding recess 22 and the surface 21 of each nose engages the surface 27 of the corresponding shaft 24. Each surface 30 lies within the corresponding surface 28 and each surface 31 lies within the corresponding surface 29. If there is any misalignment the tapered nose of each extension 29 will center itself between the opposed surfaces 28 and 29 and the inclined surface 21 will lie flush against the surface 27. The width of the extension 19 behind the tapered nose 20 is such as to form a snug guided fit between the vertical surfaces 28 and 29.

The effect of the interengagement or interfitting of the press and feeder as above described is to insure that the press and feeder will upon assembly assume proper cooperative position, the feeder being held against lateral movement by reason of the snug engagement of the respective extensions 19 between the vertical surfaces 28 and 29 and the feeder being held down against the floor or against the rails upon which it is supported and guided by the inclined surfaces 21 engaging the surfaces 27. The result is automatic fastening of the feeder to the press upon assembly so that the feeder is positively rigidly held against movement relatively to the press in any direction transverse of the direction of movement of the feeder toward and from the press.

The cams 14 are positioned so that after the rollers 17 have left the cams while the feeder is moving toward the press the feeder will advance a short distance farther to insure proper cooperation of the interfitting and interengaging portions just described. Consequently the tilting of the feeder to enable the extremity of the fixed feed board 11 to pass the top of the cylinder does not affect proper cooperation of the portions of the press and feeder which are provided to insure their proper positioning relative to each other.

While I have shown and described a present preferred embodiment of the invention it is to be distinctly understood that the invention is not limited thereto but may be otherwise variously embodied within the scope of the following claims.

I claim:

1. Material handling apparatus comprising means for operating on material, material handling mechanism adapted to cooperate with said means and to interfit therewith when operative with respect thereto, said means and said mechanism being operatively separable and assemblable by relative generally translatory movement, and means operable upon separation or assembly of said first mentioned means and said mechanism for relatively moving the same out of or into interfitting relationship.

2. Material handling apparatus comprising means for operating on material, material handling mechanism adapted to cooperate with said means and to interfit therewith when operative with respect thereto, said means and said mechanism being operatively separable and assemblable, and means operable upon separation or assembly of said first mentioned means and said mechanism to move at least one thereof transversely of the general direction of relative movement between said means and said mechanism whereby to bring said first mentioned means and said mechanism out of or into interfitting relationship.

3. Material handling apparatus comprising means for operating on material and material handling mechanism adapted to cooperate with said means, one of said means and said mechanism having a portion adapted to interfit with a portion of the other thereof when operative with respect thereto, said means and said mechanism being operatively separable and assemblable, said first mentioned portion being, upon relative movement between said means and said mechanism, movable transversely of the general direction of such relative movement whereby to bring said portions out of or into interfitting relationship.

4. Material handling apparatus comprising means for operating on material and material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism, said projecting portion being movable transversely of the general direction of such relative movement during such relative movement to enable it to pass said second mentioned portion.

5. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism, and means for moving said projecting portion transversely of the general direction of such relative movement during such relative movement to enable it to pass said second mentioned portion.

6. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism and having another portion adapted when said means and said mechanism are assembled to lie beneath and in contact with a part of the other of said means and said mechanism, and means for moving said projecting portion transversely of the general direction of such relative movement during such relative movement to enable it to pass said second mentioned portion.

7. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism, and means for tilting said projecting portion during such relative movement to enable it to pass said second mentioned portion.

8. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism, and means for tilting the one of said means and said mechanism having said projecting portion to enable said projecting portion to pass said second mentioned portion.

9. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism, and cam means for deflecting said projecting portion transversely of the general direction of such relative movement during such relative movement to enable it to pass said second mentioned portion.

10. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism, and cam means for causing the one of said means and said mechanism having said projecting portion to partake during a portion of the relative movement between said means and said mechanism of differential movement to enable said projecting portion to pass said second mentioned portion.

11. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism and having another portion adapted when said means and said mechanism are assembled to lie beneath and in contact with a part of the other of said means and said mechanism, and means for guiding said projecting portion transversely of the general direction of such relative movement during such relative movement to enable it to pass said second mentioned portion and, upon relative movement of said means and said mechanism toward assembled position, to bring said other portion and said part into cooperative relationship after said first mentioned portion has passed said second mentioned portion.

12. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to pass above a portion of the other thereof to a position in which its extremity lies behind said second mentioned portion in the general direction of relative movement between said means and said mechanism and having another portion adapted when said means and said mechanism are assembled to lie beneath and in contact with a part of the other of said means and said mechanism, and means for guiding said projecting portion upwardly over said second mentioned portion and then downwardly until said extremity lies behind said second mentioned portion and for bringing said other portion and said part into cooperative relationship after said extremity has passed said second mentioned portion upon relative movement of said means and said mechanism toward assembled position.

13. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to pass above a portion of the other thereof to a position in which its extremity lies behind said second mentioned portion in the general direction of relative movement between said means and said mechanism and having another portion adapted when said means and said mechanism are assembled to lie beneath and in contact with a part of the other of said means and said mechanism, and means for guiding the one of said means and said mechanism having said projecting portion so that said projecting portion moves upwardly over said second mentioned portion and then downwardly until said extremity lies behind said second mentioned portion and so that said other portion is brought into cooperative relationship with said part after said extremity has passed said second mentioned portion upon relative movement of said means and said mechanism toward assembled position.

14. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to pass above a portion of the other thereof to a position in which its extremity lies behind said second mentioned portion in the general direction of relative movement between said means and said mechanism and having another portion adapted when said means and said mechanism are assembled to lie beneath and in contact with a part of the other of said means and said mechanism, and means for relatively moving said means and said mechanism so that said projecting portion passes above said second mentioned portion and then assumes a position in which its extremity lies behind said second mentioned portion and so that said other portion is brought into cooperative relationship with said part after said extremity has passed said second mentioned portion upon relative movement of said means and said mechanism toward assembled position.

15. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to pass above a portion of the other thereof to a position in which its extremity lies behind said second mentioned portion in the general direction of relative movement between said means and said mechanism and having another portion adapted when said means and said mechanism are assembled to lie beneath and in contact with a part of the other of said means and said mechanism, and means for simultaneously relatively translatorily and angularly moving said means and said mechanism toward assembled position so that said projecting portion passes above said second mentioned portion and then assumes a position in which its extremity lies behind said second mentioned portion and so that said other portion is brought into cooperative relationship with said part after said extremity has passed said second mentioned portion.

16. Material handling apparatus comprising means for operating on material, material handling mechanism adapted to cooperate with said means, said means and said mechanism being operatively separable and assemblable, one of said means and said mechanism having a surface extending generally toward the other thereof but inclined to the general direction of relative movement between said means and said mechanism and the other of said means and said mechanism having a complementary inclined surface adapted upon assembly of said means and said mechanism to engage said first mentioned surface for relative positioning of said means and said mechanism.

17. Material handling apparatus comprising means for operating on material, material handling mechanism adapted to cooperate with said means, said means and said mechanism being operatively separable and assemblable, means for relatively guiding said means and said mechanism in relative movements, one of said means and said mechanism having a surface extending at an acute angle to said guiding means and generally toward the other of said means and said mechanism in a direction away from said guiding means and the other of said means and said mechanism having a portion adapted upon assembly of said means and said mechanism to engage said surface.

18. Material handling apparatus comprising means for operating on material, material handling mechanism adapted to cooperate with said means, said means and said mechanism being operatively separable and assemblable, one of said means and said mechanism having a surface extending generally toward the other thereof but inclined to the general direction of relative movement between said means and said mechanism and also having opposed surfaces extending transversely of said inclined surface and the other of said means and said mechanism having portions adapted upon assembly of said means and said mechanism to simultaneously engage said three surfaces for relative positioning of said means and said mechanism.

19. Material handling apparatus comprising means for operating on material, material handling mechanism adapted to cooperate with said means, said means and said mechanism being operatively separable and assemblable, means for relatively guiding said means and said mechanism in relative movements, one of said means and said mechanism having a surface extending at an acute angle to said guiding means and generally toward the other of said means and said mechanism in a direction away from said guiding means and also having opposed surfaces extending transversely of said first mentioned surface and the other of said means and said mechanism having portions adapted upon assembly of said means and said mechanism to simultaneously engage said three surfaces for relative positioning of said means and said mechanism.

20. Material handling apparatus comprising means for operating on material, material handling mechanism adapted to cooperate with said means, said means and said mechanism being operatively separable and assemblable, and means automatically operable upon assembly of said means and said mechanism to position said means and said mechanism rigidly against relative movement in any direction transversely of the general direction of relative movement between said means and said mechanism upon assembly.

21. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism, and means automatically operable upon assembly of said means and said mechanism to relatively position said means and said mechanism rigidly against relative movement in any direction transversely of the general direction of relative movement between said means and said mechanism upon assembly.

22. Material handling apparatus comprising means for operating on material and material handling mechanism adapted to cooperate with said means, said means and said mechanism being operatively separable and assemblable, said means and said mechanism having, respectively, cooperating portions forming rigid parts thereof automatically operable upon assembly of said means and said mechanism to relatively position said means and said mechanism rigidly against relative movement in any direction transversely of the general direction of relative movement between said means and said mechanism upon assembly.

23. Material handling apparatus comprising means for operating on material, material handling mechanism adapted to cooperate with said means, said means and said mechanism being operatively separable and assemblable, one of said means and said mechanism having a projecting portion adapted when said means and said mechanism are assembled to lie behind a portion of the other thereof in the general direction of relative movement between said means and said mechanism, and a cam on one and a cam following roller on the other of said means and said mechanism cooperable upon relative movement between said means and said mechanism to insure passage of said projecting portion past said second mentioned portion.

24. Material handling apparatus comprising means for operating on material, material handling mechanism adapted to cooperate with said means, said mechanism being movable into and out of cooperative relationship with respect to said means and comprising an integral, rigid projecting portion adapted when said mechanism is in cooperative relationship with respect to said means to lie behind a portion of said means in the general direction of relative movement between said means and said mechanism upon assembly, and means for tilting said mechanism as it otherwise moves toward or from cooperative relationship with respect to said means to insure passage of said projecting portion past said second mentioned portion.

25. Material handling apparatus comprising means for operating on material, material handling mechanism adapted to cooperate with said means, said mechanism being movable into and out of cooperative relationship with respect to said means and comprising an integral, rigid projecting portion adapted when said mechanism is in cooperative relationship with respect to said means to lie behind a portion of said means in the general direction of relative movement of said mechanism into cooperative relationship with respect to said means, means for tilting said mechanism as it otherwise moves into cooperative relationship with respect to said means to insure passage of said projecting portion past said second mentioned portion and means automatically operable upon movement of said mechanism into cooperative relationship with respect to said means to position said mechanism rigidly against movement relatively to said means in any direction transversely of the general direction of movement of said mechanism into cooperative relationship with respect to said means.

26. A sheet feeder comprising a body and a feed board fixedly connected with the body and projecting therefrom and adapted to extend into cooperative relationship with a printing or like cylinder with its extremity disposed on the opposite side of a portion of the cylinder from the body of the feeder.

27. A sheet feeder comprising a body and a feeding portion connected with the body and projecting therefrom, the feeder being bodily movable into and out of cooperative relationship with a printing or like apparatus, said feeding portion being adapted to have its extremity disposed on the opposite side of a portion of the printing or like apparatus from the body of the feeder when the feeder is in cooperative relationship with said apparatus, said portion being movable transversely of the general direction of movement of the feeder into and out of cooperative relationship with said apparatus to and from its position in which its extremity is disposed on the opposite side of a portion of said apparatus from the body of the feeder to move said extremity toward and from said position.

28. A sheet feeder comprising a body and a feeding portion fixedly connected with the body and projecting therefrom, the feeder being bodily movable into and out of cooperative relationship with a printing or like apparatus, said feeding portion being adapted to have its extremity disposed on the opposite side of a portion of the printing or like apparatus from the body of the feeder when the feeder is in cooperative relationship with said apparatus, the feeder being movable transversely of the general direction of its movement into and out of cooperative relationship with said apparatus to move said extremity toward and from said position.

29. Printing or like apparatus comprising means for printing or similarly operating on sheets, sheet feeding mechanism adapted to cooperate with said means and to interfit therewith when operative with respect thereto, said means and said mechanism being operatively separable and assemblable by relative generally translatory movement, and means operable upon separation or assembly of said means and said mechanism for relatively moving the same out of or into interfitting relationship.

30. Printing or like apparatus comprising means for printing or similarly operating on sheets, sheet feeding mechanism adapted to cooperate with said means and to interfit therewith when operative with respect thereto, said means and said mechanism being operatively separable and assemblable, and means operable upon separation or assembly of said means and said mechanism to move at least one thereof transversely of the general direction of relative movement between said means and said mechanism whereby to bring said means and said mechanism out of or into interfitting relationship.

31. Printing or like apparatus comprising means for printing or similarly operating on sheets, a sheet feeder adapted to cooperate with said means and movable into and out of cooperative relationship therewith, the feeder having a projecting portion adapted when said means and feeder are assembled to lie behind a portion of said means in the general direction of movement of the feeder relative thereto and having another portion adapted when said means and feeder are assembled to lie beneath and in contact with a part of said means, and means for moving said projecting portion transversely of the general direction of movement of the feeder relative to said means during such movement to enable it to pass said second mentioned portion.

32. Printing or like apparatus comprising means for printing or similarly operating on sheets, a sheet feeder adapted to cooperate with said means and movable into and out of cooperative relationship therewith and means automatically operable upon movement of the feeder into cooperative relationship with said means to position the feeder relatively to said means rigidly against movement in any direction transversely of the general direction of movement of the feeder into and out of cooperative relationship with said means.

33. Printing or like apparatus comprising means for printing or similarly operating on sheets, a sheet feeder adapted to cooperate with said means, the feeder being movable into and out of cooperative relationship with respect to said means and comprising an integral, rigid projecting portion adapted when the feeder is in cooperative relationship with respect to said means to lie behind a portion of said means in the general direction of relative movement of the feeder into cooperative relationship with respect to said means, means for tilting the feeder as it otherwise moves into cooperative relationship with respect to said means to insure passage of said projecting portion past said second mentioned portion and means automatically operable upon movement of the feeder into cooperative relationship with respect to said means to position the feeder rigidly against movement relatively to said means in any direction transversely of the general direction of movement of the feeder into cooperative relationship with respect to said means.

34. Printing or like apparatus comprising a cylinder, guides for positioning sheets to be taken by the cylinder, a sheet feeder adapted to cooperate with the cylinder and movable into and out of cooperative relationship therewith, the feeder having a feed board which, when the feeder is in cooperative relationship with respect to the cylinder, projects into cooperative relationship with said guides and terminates at a point behind a portion of the cylinder in the general direction of movement of the feeder into and out of cooperative relationship with the cylinder, and means for tilting the feeder as it otherwise moves into cooperative relationship with respect to the cylinder to insure passage of the extremity of the feed board past the cylinder.

35. Printing or like apparatus comprising means for printing or similarly operating on sheets, a sheet feeder adapted to cooperate with said means, said means and said feeder being operatively separable and assemblable, means for relatively guiding said means and said feeder in relative movements, one of said means and said feeder having a surface extending at an acute angle to said guiding means and generally toward the other of said means and said feeder in a direction away from said guiding means and the other of said means and said feeder having a portion adapted upon assembly of said means and said feeder to engage said surface.

36. Printing or like apparatus comprising means for printing or similarly operating on sheets, a sheet feeder adapted to cooperate with said means, said means and said feeder being operatively separable and assemblable, one of said means and said feeder having a surface extending generally toward the other thereof but inclined to the general direction of relative movement between said means and said feeder and also having opposed surfaces extending transversely of said inclined surface and the other of said means and said feeder having portions adapted upon assembly of said means and said feeder to simultaneously engage said three surfaces for relative positioning of said means and said feeder.

37. Printing or like apparatus comprising a press frame, a cylinder mounted therein, a sheet feeder having a frame and adapted to cooperate with the cylinder and movable into and out of cooperative relationship therewith, portions of the press frame and feeder frame automatically engaging upon movement of the feeder into cooperative relationship with the cylinder to maintain the feeder fixedly positioned relatively to the press frame against movement in any direction transversely of the general direction of movement of the feeder toward and from cooperative relationship with the cylinder.

38. Printing or like apparatus comprising a frame, a cylinder mounted therein, guide means for positioning sheets to be taken by the cylinder, a feeder adapted to be moved into and out of cooperative relationship with respect to the cylinder, the feeder having a feed board forming a rigid part thereof and adapted to extend into cooperative relationship with respect to said guide means when the feeder is positioned in cooperative relationship with respect to the cylinder, and cam and follower means on the feeder and said frame for guiding the feeder as it moves into and out of cooperative relationship with respect to the cylinder.

39. Printing or like apparatus comprising a frame, a cylinder mounted therein, a feeder adapted to be moved toward and away from the cylinder in generally straight line movement, the feeder having a body and a portion adapted to extend into cooperative relationship with the cylinder with its extremity disposed on the opposite side of a portion of the cylinder from the body of the feeder when the feeder has been moved toward the cylinder and a cam on the frame and a follower on the feeder adapted to follow said cam as the feeder moves toward or away from the cylinder, the coaction of said cam and follower causing the feeder temporarily to depart from generally straight line movement during movement toward or away from the cylinder to enable the extremity of said portion of the feeder to pass said portion of the cylinder.

40. Printing or like apparatus comprising a frame, a cylinder mounted therein, a feeder adapted to be moved toward and away from the cylinder in generally straight line movement, the feeder having a body and a portion adapted to extend into cooperative relationship with the cylinder with its extremity disposed on the opposite side of a portion of the cylinder from the body of the feeder when the feeder has been moved toward the cylinder and a cam on the frame and a follower on the feeder adapted to follow said cam as the feeder moves toward or away from the cylinder, the coaction of said cam and follower causing the feeder temporarily to depart from generally straight line movement during movement toward or away from the cylinder to enable the extremity of said portion of the feeder to pass said portion of the cylinder, the feeder and frame also having means automatically cooperable upon movement of the feeder toward the cylinder to hold the feeder rigidly relatively to the frame against movement in any direction transversely of the direction of movement of the feeder toward and from the cylinder.

JOSEPH SINKOVITZ.